(12) United States Patent
Fukui et al.

(10) Patent No.: US 10,030,736 B2
(45) Date of Patent: Jul. 24, 2018

(54) DAMPING VALVE

(71) Applicant: KAYABA INDUSTRY CO., LTD., Tokyo (JP)

(72) Inventors: Takahiro Fukui, Gifu (JP); Masahiro Miwa, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/772,235

(22) PCT Filed: Feb. 26, 2014

(86) PCT No.: PCT/JP2014/054674
§ 371 (c)(1),
(2) Date: Sep. 2, 2015

(87) PCT Pub. No.: WO2014/156445
PCT Pub. Date: Oct. 2, 2014

(65) Prior Publication Data
US 2016/0010714 A1  Jan. 14, 2016

(30) Foreign Application Priority Data

Mar. 25, 2013  (JP) .................................. 2013-061284

(51) Int. Cl.
*F16F 9/348* (2006.01)
*F16K 47/04* (2006.01)
(52) U.S. Cl.
CPC ............ *F16F 9/348* (2013.01); *F16F 9/3484* (2013.01); *F16K 47/04* (2013.01)

(58) Field of Classification Search
CPC ........ F16F 9/3485; F16F 9/348; F16F 9/5126; F16F 9/516; F16F 9/3487; F16F 9/3488;
(Continued)

(56) References Cited

U.S. PATENT DOCUMENTS 3,312,312 A * 4/1967 Bourcier ................... F16F 9/18
188/317
4,899,855 A * 2/1990 de Carbon .............. F16F 9/348
137/493.8
(Continued)

FOREIGN PATENT DOCUMENTS

DE  10222053 A1 * 11/2003 ............. F16F 9/348
DE  10347204 A1   5/2005
(Continued)

*Primary Examiner* — Bradley T King
*Assistant Examiner* — Stephen M Bowes
(74) *Attorney, Agent, or Firm* — Rabin & Berdo, P.C.

(57) ABSTRACT

A damping valve includes an annular valve disc, the valve disc having an annular outer peripheral sheet that projects toward an axial direction of the valve disc, an inner peripheral sheet that is provided on an inside of the outer peripheral sheet and projects toward the axial direction, an annular window formed between the outer peripheral sheet and the inner peripheral sheet, and a port that communicates with the annular window. The damping valve comprises an annular leaf valve that is laminated on the valve disc and is seated/unseated on the outer peripheral sheet, an annular spacer that is interposed between the leaf valve and the inner peripheral sheet and sets an initial deflection amount of the leaf valve, and a positioning part that restricts positional deviation of the spacer in a radial direction relative to the valve disc.

6 Claims, 11 Drawing Sheets

(58) Field of Classification Search
CPC ....... F16F 9/3214; F16F 9/3482; F16K 15/14;
F16K 15/148; F16K 17/0413
USPC ........................................................ 137/854
See application file for complete search history.

(56) References Cited

U.S. PATENT DOCUMENTS

| | | | | |
|---|---|---|---|---|
| 2002/0134629 A1* | 9/2002 | Bataille | .................. | F16F 9/348 |
| | | | | 188/282.1 |
| 2007/0034466 A1* | 2/2007 | Paesmans | .............. | B60G 17/08 |
| | | | | 188/322.22 |

FOREIGN PATENT DOCUMENTS

| | | | |
|---|---|---|---|
| JP | 2000-055103 A | | 2/2000 |
| JP | 2001-020990 A | | 1/2001 |
| JP | 2006-322488 A | | 11/2006 |
| JP | 2007211908 A | * | 8/2007 |

* cited by examiner

DAMPING VALVE

TECHNICAL FIELD

The present invention relates to a damping valve.

BACKGROUND ART

A damping valve is used in, for example, a piston that constitutes a vehicle shock absorber. A damping valve is constituted by a piston and an annular leaf valve. A piston includes an annular outer peripheral seat, an inner peripheral seat provided on the inside of the outer peripheral seat, an annular window formed between the outer peripheral seat and the inner peripheral seat, and a port that communicates with the annular window. The annular leaf valve is laminated on the piston, and an inner peripheral side of the leaf valve is fixed to a piston rod and an outer peripheral portion of the leaf valve is seated/unseated on the outer peripheral seat.

The leaf valve is laminated between the outer peripheral seat and the inner peripheral seat. Normally, by making the height in the axial direction of the outer peripheral seat greater than the height in the axial direction of the inner peripheral seat, the leaf valve can be deflected in advance just by laminating and fixing the leaf valve on the piston. Thereby, a valve opening pressure of the leaf valve is set. A spacer is interposed between the inner peripheral seat and the leaf valve, and the outer diameter of the spacer is nearly the same as the outer diameter of the inner peripheral seat. Thereby, an initial deflection amount imparted to the leaf valve can be adjusted, and thus the opening valve pressure of the leaf valve can be adjusted (for example, refer to JP2000-55103A).

A leaf valve is generally constituted by laminating a plurality of thin annular plates, and thus a damping valve having such a leaf valve is made of numerous parts. When assembling such a damping valve, first, the piston, spacer, and leaf valve are assembled on a rod-shaped retaining pin, and then these parts are removed from the retaining needle and mounted on the piston rod. Therefore, the damping valve can be efficiently assembled (refer to JP2001-20990A).

SUMMARY OF INVENTION

However, in the structure of the above-described damping valve, when moving the piston, spacer, and leaf valve from the retaining pin to the piston rod, the spacer can move freely in the radial direction between the piston and leaf valve, and thus positional deviation of the spacer may occur. In a state in which the spacer has positionally deviated by a large amount, the spacer may interfere with the piston rod when trying to assemble the spacer on the piston rod together with the piston and the leaf valve. Further, since the spacer is interposed between the leaf valve and the piston, the spacer is not visible from the outside. Therefore, there has been a problem in that the process of assembling these parts on the piston rod is troublesome.

Thus, an object of the present invention is to provide a damping valve with improved assemblability.

According to one embodiment, a damping valve includes an annular valve disc, the valve disc having an annular outer peripheral seat that projects toward an axial direction of the valve disc an inner peripheral seat that is provided on an inside of the outer peripheral seat and projects toward the axial direction an annular window formed between the outer peripheral seat and the inner peripheral seat and a port that communicates with the annular window an annular leaf valve that is laminated on the valve disc and is seated/unseated on the outer peripheral seat an annular spacer that is interposed between the leaf valve and the inner peripheral seat and sets an initial deflection amount of the leaf valve a positioning part that restricts positional deviation of the spacer in a radial direction relative to the valve disc.

DESCRIPTION OF EMBODIMENTS

Figure 1:
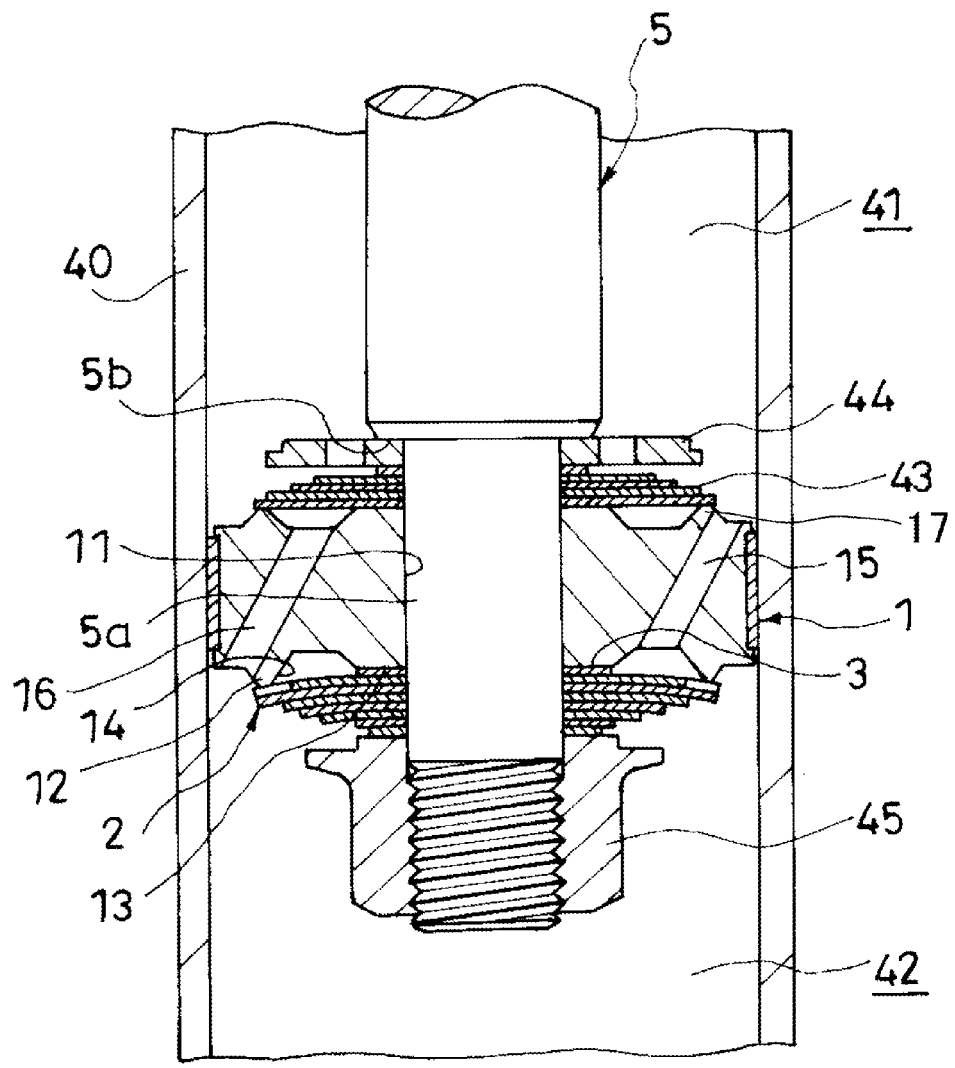
FIG. 1 is a vertical cross-section view of a piston of a shock absorber in which a damping valve according to a first embodiment of the present invention is implemented.

Embodiments of the present invention will now be explained below referring to the drawings.

As shown in FIG. 1, a damping valve according to a first embodiment of the present invention is an extension-side damping valve that produces a damping force when the shock absorber extends. This damping valve includes a piston 1 that serves as a valve disc, a leaf valve 2, and a spacer 3.

A shock absorber to which the damping valve of the present embodiment is applied is well known, and thus it will be briefly explained below without any detailed illustration.

The shock absorber includes, for example, a cylinder 40, a rod guide (not illustrated) that seals a lower end of the cylinder 40, a piston rod 5 that slidably penetrates through the rod guide, and the piston 1 that is fixed to a distal end 5a of the piston rod 5 that forms a shaft member, the distal end 5a being inserted into the piston 1. The shock absorber also includes an extension-side chamber 41 (upper side in FIG. 1) and a pressure-side chamber 42 (lower side in FIG. 1) that are separated by the piston 1 within the cylinder 40, and a sealing member (not illustrated) that seals an upper end of the cylinder 40. The shock absorber further includes a reservoir or an air chamber (not illustrated) that compensates a volume change within the cylinder in an amount of the volume of the piston rod 5 that moves into and out of the cylinder 40. Hydraulic oil that serves as a fluid is also filled into the cylinder 40 that constitutes the shock absorber.

In the damping valve according to the present embodiment utilized in the above-described shock absorber, when the piston 1 moves upwards in FIG. 1 relative to the cylinder 40, the pressure within the extension-side chamber 41 rises, and thus the hydraulic oil moves from the extension-side chamber 41 to the pressure-side chamber 42 via a port 15. At this time, resistance is applied to the hydraulic oil moving through the port 15 by the leaf valve 2, and thus a prescribed pressure loss occurs between the extension-side chamber 41 and the pressure-side chamber 42. Thereby, the damping valve functions as a damping force producing element that produces a prescribed damping force in the shock absorber.

The damping valve of the present embodiment will be explained in further detail below referring to FIG. 1.

The piston 1, which serves as a valve disc, is formed in an annular shape. The piston 1 includes an insertion hole 11 at the axial center thereof into which the distal end 5a of the piston rod 5 that constitutes the shock absorber is inserted, and an annular outer peripheral seat 12 that is formed at one end (the lower end in FIG. 1) of the piston 1 and projects in the axial direction. The piston 1 also includes an inner peripheral seat 13 that is provided inside of the outer peripheral seat 12 at one end of the piston 1 similar to the outer peripheral seat 12 and projects in the axial direction, and an annular window 14 that is similarly formed at one end of the piston 1 between the outer peripheral seat 12 and the inner peripheral seat 13. The piston 1 further includes a port 15 that communicates with the annular window 14 from the other end side of the piston 1.

The height in the axial direction of the outer peripheral seat 12 is greater than the height in the axial direction of the inner peripheral seat 13. A pressure-side port 16 that permits the flow of hydraulic oil from the pressure-side chamber 42 toward the extension-side chamber 41 when the shock absorber contracts is provided in the piston 1.

As described above, the piston rod 5 is inserted into the insertion hole 11 of the piston 1, and the distal end 5a of the piston rod 5 projects above the piston 1. The outer diameter of the distal end 5a of the piston rod 5 is set to be smaller than the outer diameter of upper side of the piston rod 5 above the distal end 5a in FIG. 1, and a stepped part 5b is formed at the portion where the outer diameter of the upper side of the piston rod 5 and the outer diameter of the distal end 5a differ.

The leaf valve 2 is formed by laminating a plurality of thin annular plates. The annular plates of the leaf valve 2 are laminated on the lower end of the piston 1, and the inner peripheral side of the leaf valve 2 is fixed to the distal end 5a of the piston rod 5 whereas the outer peripheral side of the leaf valve 2 is permitted to deflect.

The outer peripheral side of the leaf valve 2 is seated on the outer peripheral seat 12. When the differential pressure between the pressure in the extension-side chamber 41 received from the port 15 and the pressure in the pressure-side chamber 42 reaches a valve opening pressure, the leaf valve 2 deflects and becomes unseated from the outer peripheral seat 12. Thereby, the port 15 is opened and resistance is applied to the flow of fluid passing through the port 15. In this way, the damping valve is configured such that an extension-side damping passage is formed by the leaf valve 2 and the port 15 when the shock absorber extends, and thus an extension-side damping force is exerted.

The spacer 3 is formed in an annular shape, and the distal end 5a of the piston rod 5 is inserted into the inner peripheral side of the spacer 3. The spacer 3 is sandwiched between the inner peripheral seat 13 of the piston 1 and the leaf valve 2, and is fixed to the piston rod 5 similar to the leaf valve 2.

In the present embodiment, the spacer 3 is integrated by being welded or adhered to the annular plate that is disposed at the uppermost level in FIG. 1 among the plurality of annular plates that constitute the leaf valve 2. Thereby, a positioning part is constituted in the present embodiment.

A plurality of annular pressure-side leaf valves 43 are laminated at the upper end in FIG. 1 of the piston 1, and these pressure-side leaf valves 43 open and close an outlet end of a pressure-side port 16. Further, an annular valve stopper 44 that restricts the amount of deflection of the pressure-side leaf valves 43 is laminated above the pressure-side leaf valves 43 in FIG. 1.

In the present embodiment, a lower end in FIG. 1 of the pressure-side port 16 serves as an suction-side end that suctions the fluid, and this suction-side end is disposed more toward the outer peripheral side than the outer peripheral seat 12 provided on one end of the piston 1 so that the suction-side end of the pressure-side port 16 cannot be blocked by the leaf valve 2 laminated on the piston 1.

An upper end in FIG. 1 of the port 15 serves as a suction-side end, and this suction-side end is formed more toward the outer periphery than the pressure-side port 16 formed on the other end (upper end) of the piston 1. The suction-side end of the port 15 opens more toward the outer periphery than a pressure-side seat 17 on which the pressure-side leaf valves 43 are seated/unseated. Therefore, the suction-side end of the port 15 is formed so that it cannot be blocked by the pressure-side leaf valves 43.

When the piston 1 moves downward in FIG. 1, the pressure within the pressure-side chamber 42 rises. Thereby, the fluid moves from the pressure-side chamber 42 into the extension-side chamber 41 via the pressure-side port 16, and resistance is applied to this flow of fluid by the pressure-side leaf valves 43. Thus, the damping valve exerts a pressure-side damping force when the shock absorber contracts.

The spacer 3, leaf valve 2, pressure-side leaf valves 43, and the valve stopper 44 that are laminated in the piston 1 are assembled on the outer periphery of the distal end 5a of the piston rod 5 together with the piston 1, and then fixed to the piston rod 5 by fastening with a piston nut 45 that is threaded onto the tip of the distal end 5a.

The thickness in the axial direction of the spacer 3 is set to be thinner than the difference between the height in the axial direction of the outer peripheral seat 12 of the piston 1 and the height in the axial direction of the inner peripheral seat 13. As described above, if the leaf valve 2 is laminated on the piston 1 via the spacer 3 and then fixed to the piston rod 5, an initial deflection is imparted to the leaf valve 2 by the height difference between the end of the spacer 3 and the end of the outer peripheral seat 12. Thus, the outer peripheral side of the leaf valve 2 deflects and becomes seated on the outer peripheral seat 12. The initial deflection amount can be adjusted by changing the thickness of the spacer 3, and thus it is possible to set the valve opening pressure of the leaf valve 2 to a predetermined value by the thickness of the spacer 3.

Figure 2:
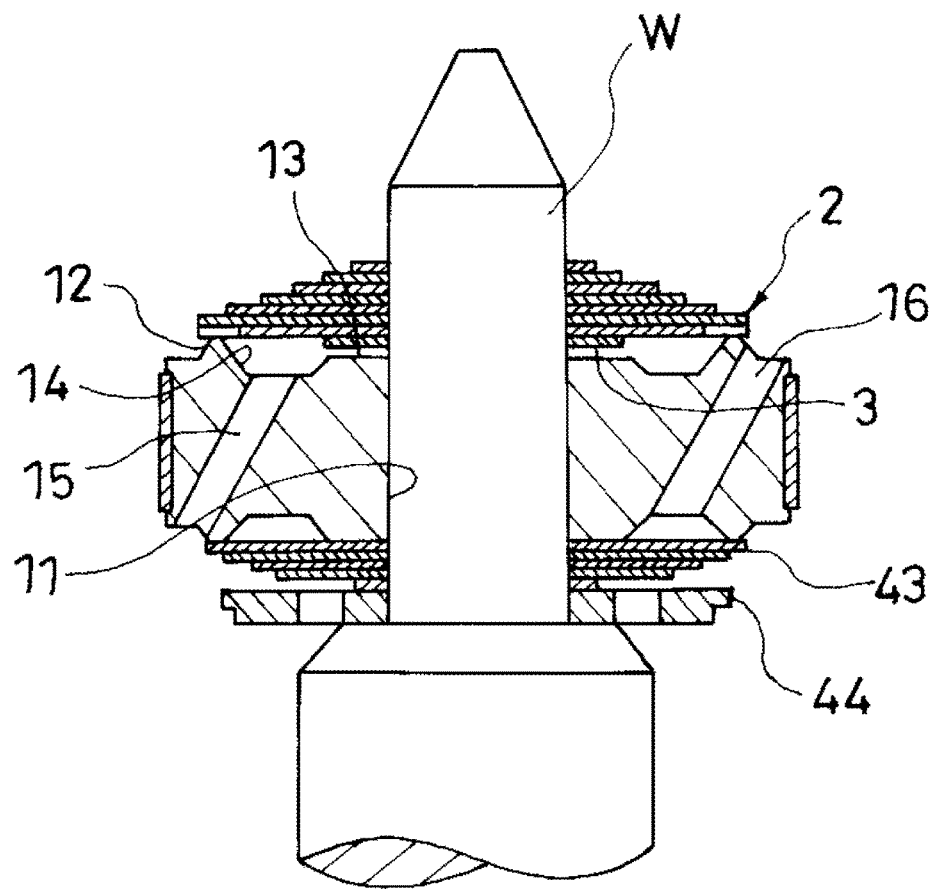
FIG. 2 illustrates a state in which the damping valve is temporarily assembled on a retaining pin.

In order to assemble the piston 1, the spacer 3, the leaf valve 2, the pressure-side leaf valves 43, and the valve stopper 44 on the distal end 5a of the piston rod 5, these members are first temporarily assembled on a retaining pin W as shown in FIG. 2 before assembling them on the piston rod 5. At this time, the spacer 3 is interposed between the leaf valve 2 and the piston 1, and thus it is difficult to see the spacer 3 from the outside once it has been temporarily assembled on the retaining pin W.

When moving the above members from the retaining pin W to the distal end 5a of the piston rod 5, the leaf valve 2 is grasped together with the piston 1 to move them together. At this time, since the spacer 3 is integrated with the leaf valve 2 by welding or adhesion and positioned in the piston 1, the spacer 3 can be prevented from moving in the radial direction between the piston 1 and the leaf valve 2.

Therefore, any significant deviations of the inside hole of the spacer 3 relative to the insertion hole 11 of the piston 1 and the inside hole of the leaf valve 2, which may lead to difficulties in inserting the distal end 5a of the piston rod 5 into the inner peripheral hole of the spacer 3, can be prevented.

In this way, by providing a positioning part to the damping valve for restricting the positional deviation of the spacer 3 in the radial direction relative to the piston 1, significant positional deviations of the spacer 3 are prevented, and thus any difficulties in inserting the piston rod 5 into the hole of the spacer 3 and the like are eliminated. Therefore, the assemblability of the members onto the piston rod 5 is improved, and the assembly process is facilitated.

Next, a damping valve according to a second embodiment of the present invention will be explained.

Figure 3:
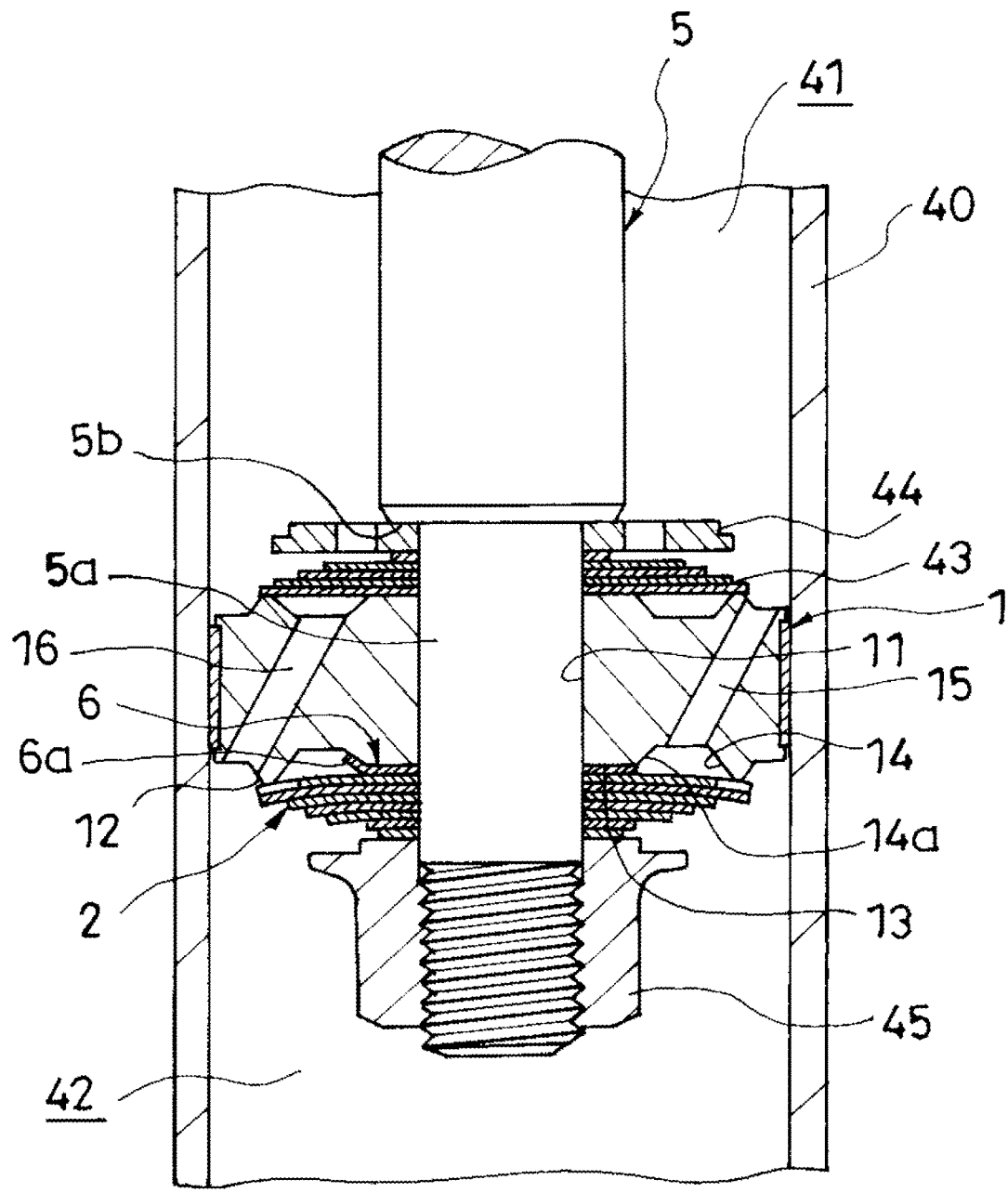
FIG. 3 is a vertical cross-section view of a piston of a shock absorber in which a damping valve according to a second embodiment of the present invention is implemented.

In the damping valve of the second embodiment, as shown in FIG. 3, the structure of a spacer 6 differs from that in the damping valve of the first embodiment. The members that constitute the damping valve other than the spacer 6 are the same as those constituting the damping valve of the first embodiment. Thus, in order to avoid redundant explanations, members which are the same will be assigned the same reference numerals and detailed explanations thereof will be omitted.

Figure 4:
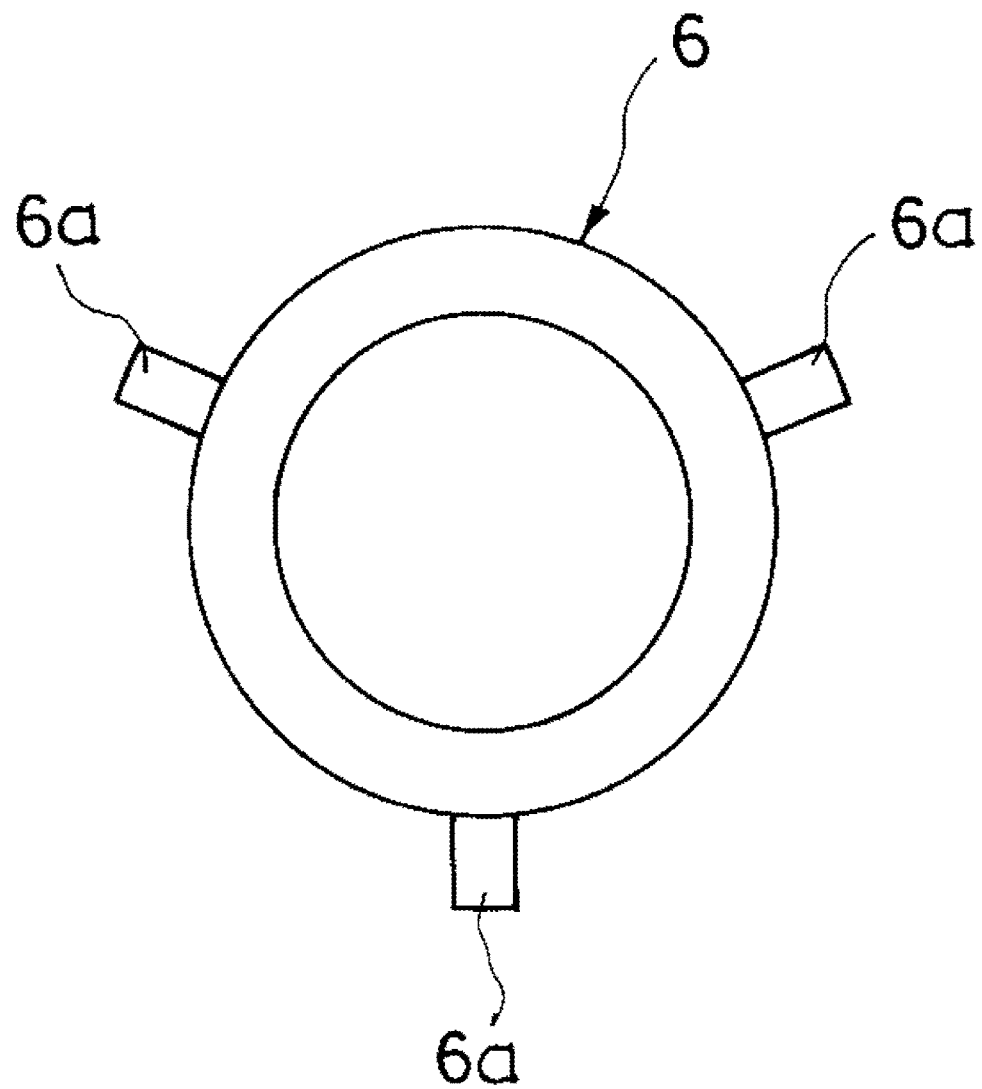
FIG. 4 is a plan view of a spacer in the damping valve according to the second embodiment.

As shown in FIGS. 3 and 4, the spacer 6 includes three pawls 6a on the outer periphery of the spacer 6, the pawls 6a extending toward the piston 1 side, which is the valve disc side, and being inserted into the annular window 14. Even if the spacer 6 moves in the radial direction relative to the piston 1, the pawls 6a hook onto an inner peripheral wall 14a of the annular window 14, and thus the spacer 6 does not deviate significantly in the radial direction.

In this way, the positioning part in the damping valve of the second embodiment is constituted by the pawls 6a. The number of pawls 6a to be disposed should be three or more on the outer periphery of the spacer 6, because significant positional deviation of the spacer 6 relative to the piston 1 can be prevented as long as there are at least three pawls 6a.

The pawls 6a may be inserted into the ports 15. If the pawls 6a are to be inserted into the ports 15, for example, as shown in FIG. 5A, in the piston 1, six ports 15 are provided at equal intervals in the peripheral direction and three pawls 6a provided on the spacer 6 are inserted into every other port 15.

Figure 5A:
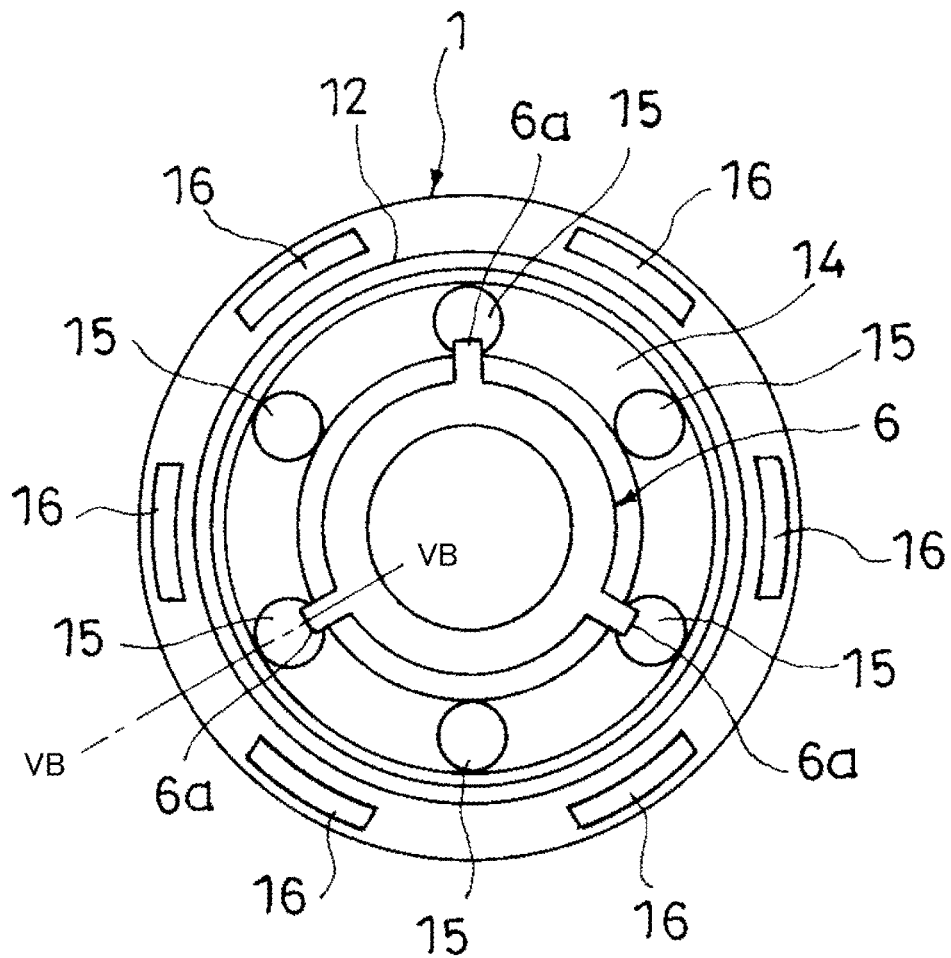
FIG. 5A is a plan view of a piston of a shock absorber and a spacer in which a damping valve of an alternative embodiment of the second embodiment is implemented.
Figure 5B:
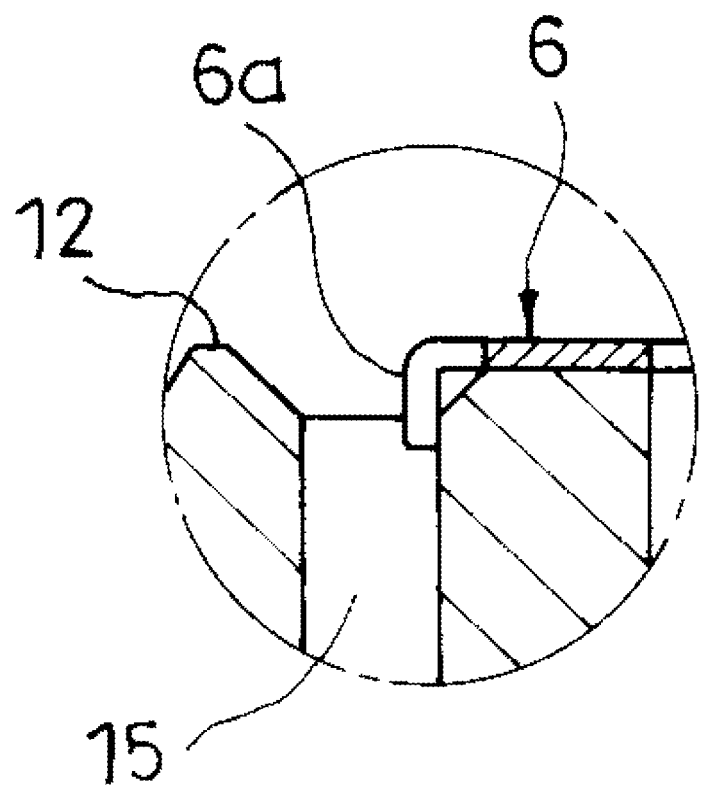
FIG. 5B is a cross-section view when the damping valve shown in FIG. 5A is cut along line VB-VB.

FIG. 5B is a partially enlarged view of a cross-section of the damping valve when cut along line VB-VB shown in FIG. 5A in order to facilitate the understanding regarding the structure of the pawls 6a.

As shown in FIG. 5B, if the pawls 6a are inserted into the ports 15, even if the spacer 6 moves in the radial direction relative to the piston 1, any movement of the pawls 6a is restricted by the ports 15. Thus, the spacer 6 does not deviate significantly in the radial direction.

With regard to the number of pawls 6a to be disposed, the number of pawls 6a provided to the spacer 6 may be the same as the number of ports 15. Alternatively, if the pawls 6a are to be inserted into the ports 15, as long as at least two pawls 6a are inserted into respectively different ports 15, significant positional deviation in the radial direction of the spacer 6 relative to the piston 1 can be prevented, and thus at least two pawls 6a should be provided.

Therefore, in the damping valve of the second embodiment, since the spacer 6 is interposed between the leaf valve 2 and the piston 1, the spacer 6 cannot be seen from the outside once it has been temporarily assembled on the retaining pin W. However, when moving from the retaining pin W to the distal end 5a of the piston rod 5, as long as the leaf valve 2 is grasped together with the piston 1 to move them together, the spacer 6 will not significantly positionally deviate in the radial direction because the spacer 6 is positioned on the piston 1 by the pawls 6a. Therefore, it will not be difficult to insert the distal end 5a of the piston rod 5 into the hole on the inner periphery of the spacer 6, and thus the assemblability onto the piston rod 5 is improved and the assembly process becomes easier.

A damping valve according to a third embodiment of the present invention will now be explained below.

Figure 6:
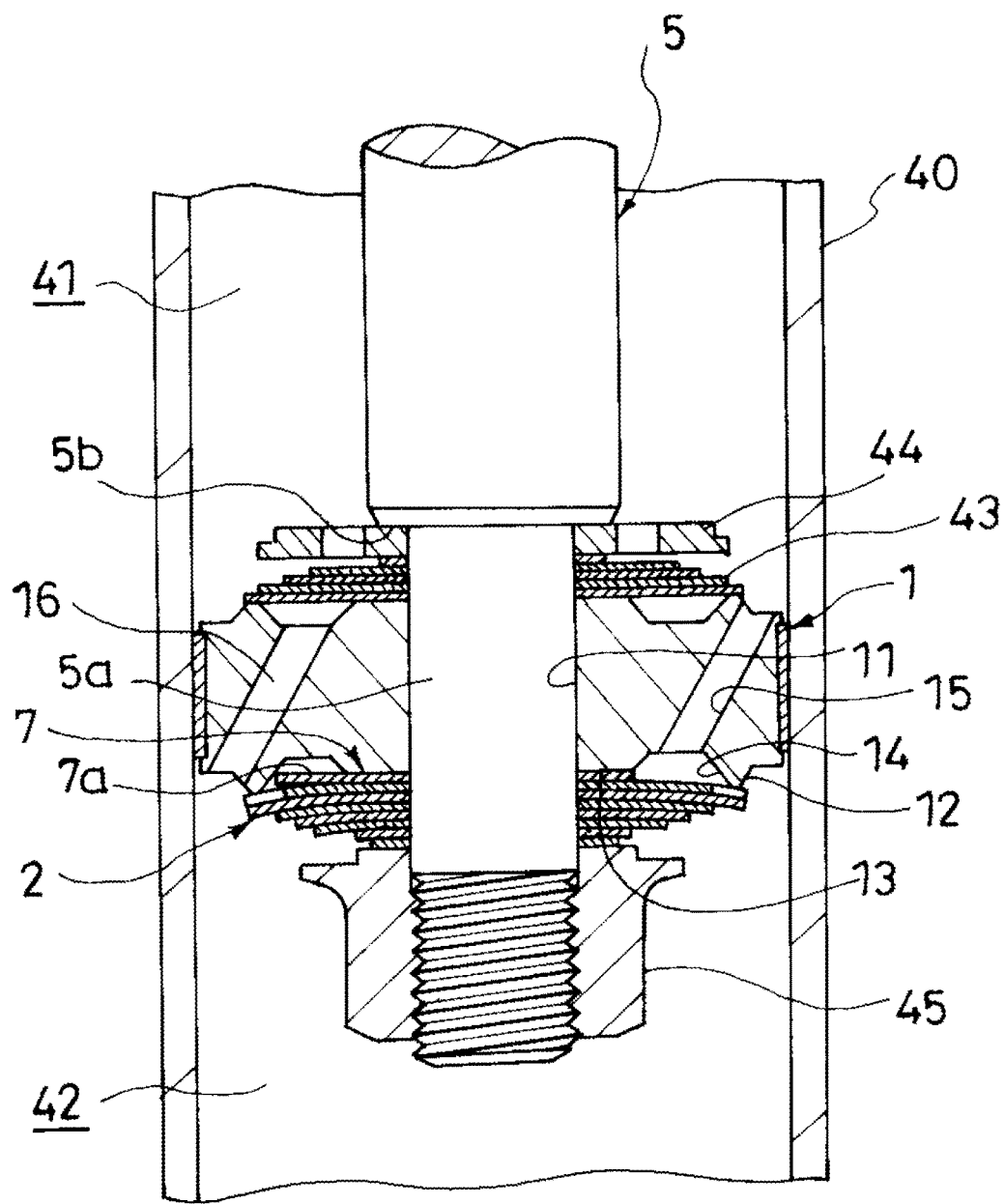
FIG. 6 is a vertical cross-section view of a piston of a shock absorber in which a damping valve according to a third embodiment of the present invention is implemented.

In the damping valve according to the third embodiment, as shown in FIG. 6, the structure of a spacer 7 differs from that in the damping valve of the first embodiment. The members that constitute the damping valve other than the spacer 7 are the same as those constituting the damping valve of the first embodiment. Thus, in order to avoid redundant explanations, members which are the same will be assigned the same reference numerals and detailed explanations thereof will be omitted.

Figure 7:
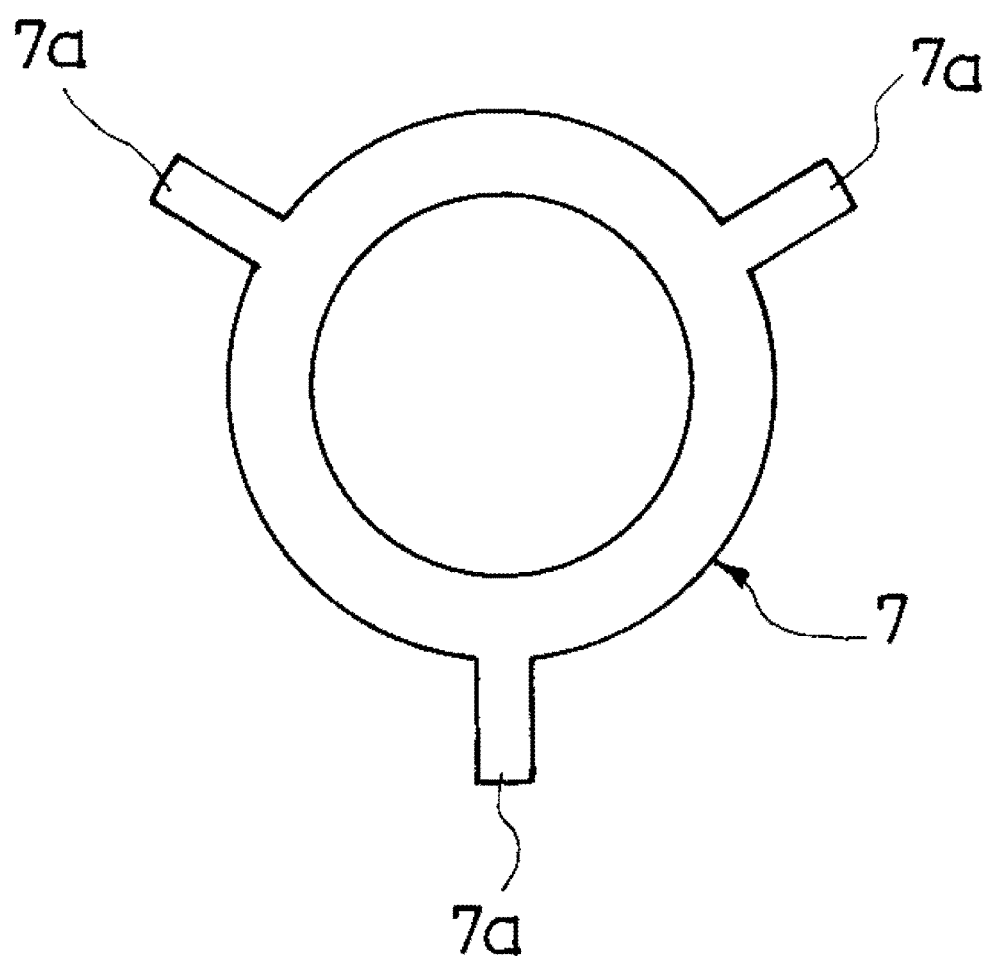
FIG. 7 is a plan view of a spacer of the damping valve according to the third embodiment.

As shown in FIGS. 6 and 7, the spacer 7 includes at least three arms 7a that extend radially from the outer periphery of the spacer 7 and oppose the inner periphery of the outer peripheral seat 12 of the piston 1. Even if the spacer 7 moves in the radial direction relative to the piston 1, the arms 7a abut an inner peripheral wall 12a of the outer peripheral seat 12, and thus any further deviation of the spacer 7 is prevented. Therefore, the spacer 7 does not significantly deviate in the radial direction.

In this way, the positioning part in the damping valve of the third embodiment is constituted by the arms 7a. The number of arms 7a to be disposed should be three or more on the outer periphery of the spacer 7, because significant positional deviation of the spacer 7 relative to the piston 1 can be prevented as long as there are at least three arms 7a.

Therefore, in the damping valve of the third embodiment, since the spacer 7 is interposed between the leaf valve 2 and the piston 1, the spacer 7 cannot be seen from the outside once it has been temporarily assembled on the retaining pin W. However, when moving from the retaining pin W to the distal end 5a of the piston rod 5, as long as the leaf valve 2 is grasped together with the piston 1 to move them together, the spacer 7 will not significantly positionally deviate in the radial direction because the spacer 7 is positioned on the piston 1 by the arms 7a. Therefore, it will not be difficult to insert the distal end 5a of the piston rod 5 into the hole on the inner periphery of the spacer 7, and thus the assemblability onto the piston rod 5 is improved and the assembly process becomes easier.

A damping valve according to a fourth embodiment of the present invention will now be explained below.

Figure 8:
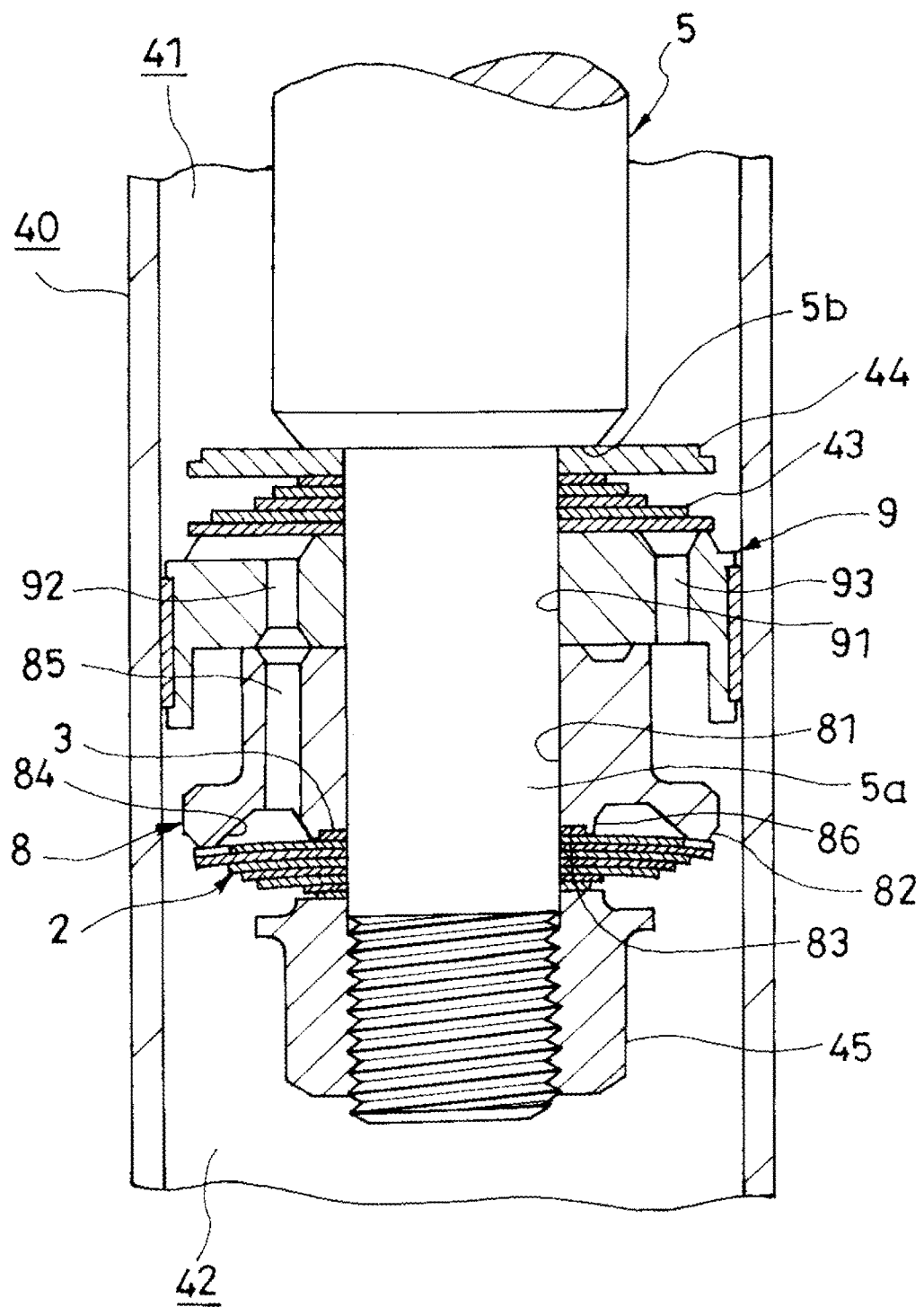
FIG. 8 is a vertical cross-section view of a piston of a shock absorber in which a damping valve according to a fourth embodiment of the present invention is implemented.

In the damping valve according to the fourth embodiment, as shown in FIG. 8, the structure of a valve disc 8 differs from that in the damping valve of the first embodiment. The members that constitute the damping valve other than the valve disc 8 are the same as those constituting the damping valve of the first embodiment. Thus, in order to avoid redundant explanations, members which are the same will be assigned the same reference numerals and detailed explanations thereof will be omitted.

The valve disc 8 is formed in an annular shape, and a lower end of the valve disc 8, or in other words one end of the valve disc 8, is expanded in diameter in a flanged manner as shown in FIG. 8.

The valve disc 8 includes an insertion hole 81 at the axial center thereof, into which the distal end 5*a* of the piston rod 5 of the shock absorber is inserted, and an annular outer peripheral seat 82 that is formed at one end (the lower end in FIG. 1) of the valve disc 8 and projects in the axial direction. The valve disc 8 also includes an inner peripheral seat 83 that is provided inside of the outer peripheral seat 82 at one end of the valve disc 8 similar to the outer peripheral seat 82 and projects in the axial direction, and an annular window 84 that is similarly formed at one end of the valve disc 8 between the outer peripheral seat 82 and the inner peripheral seat 83. The valve disc 8 further includes a port 85 that communicates with the annular window 84 from the other end side of the valve disc 8, and a projection 86 that projects toward the axial direction from the outer periphery of the inner peripheral seat 83.

The valve disc 8 is used by being laminated on a piston 9. A spacer 3 is laminated on the inner peripheral seat 83, and a leaf valve 2 is laminated between the spacer 3 and the outer peripheral seat 82.

The piston 9 is formed in an annular shape. The piston 9 includes an insertion hole 91 at an axial core thereof, into which the distal end 5*a* of the piston rod 5 of the shock absorber is inserted, and piston ports 92 that penetrate through the piston 9 in the axial direction and are provided on the same circumference. The piston 9 also includes a plurality of piston ports 93 that penetrate through the piston 9 in the axial direction and are provided on a circumference of a larger diameter than the circumference on which the plurality of piston ports 92 are provided.

When the valve disc 8 is laminated on the piston 9, the ports 85 communicate with the piston ports 92, and the ports 85 and the piston ports 92 form extension-side damping passages that permit the flow of liquid from the extension-side chamber 41 toward the pressure-side chamber 42. Resistance is applied by the leaf valve 2 on the flow of liquid passing through this extension-side damping passages, and thus a damping force can be exerted.

In contrast, the piston ports 93 of the piston 9 function as pressure-side ports. The pressure-side leaf valves 43 apply resistance to the flow of liquid passing through the piston ports 93 from the pressure-side chamber 42 toward the extension-side chamber 41, and thereby the damping valve exerts a pressure-side damping force.

In this way, by using the valve disc 8, a seat diameter in the case that the leaf valve 2 is seated on the outer peripheral seat 82 can be increased compared to a seat diameter when the leaf valve 2 is laminated on the piston 9, and the extension-side damping force when the piston 9 is moving at high speed can be decreased.

Further, the valve disc 8 includes the projection 86 that projects toward the axial direction from the outer periphery of the inner peripheral seat 83, and the projection 86 opposes the outer periphery of the spacer 3. Therefore, significant movement of the spacer 3 in the radial direction relative to the valve disc 8 is restricted. In this way, the positioning part in the damping valve of the fourth embodiment is constituted by the projection 86. The projection 86 may be configured annularly opposing the entire periphery of the spacer 3. Alternatively, even if the projection 86 is not provided annularly, as long as at least three projections 86 are provided, significant positional deviation of the spacer 3 in the radial direction relative to the valve disc 8 can be prevented.

Therefore, in the damping valve of the fourth embodiment, since the spacer 3 is interposed between the leaf valve 2 and the valve disc 8, the spacer 3 cannot be seen from the outside once it has been temporarily assembled on the retaining pin W. However, when moving from the retaining pin W to the distal end 5*a* of the piston rod 5, as long as the leaf valve 2 is grasped together with the valve disc 8 to move them together, the spacer 3 will not significantly positionally deviate in the radial direction because the spacer 3 is positioned on the valve disc 8 by the projection 86. Therefore, it will not be difficult to insert the distal end 5*a* of the piston rod 5 into the hole on the inner periphery of the spacer 3, and thus the assemblability onto the piston rod 5 is improved and the assembly process becomes easier.

Figure 9:
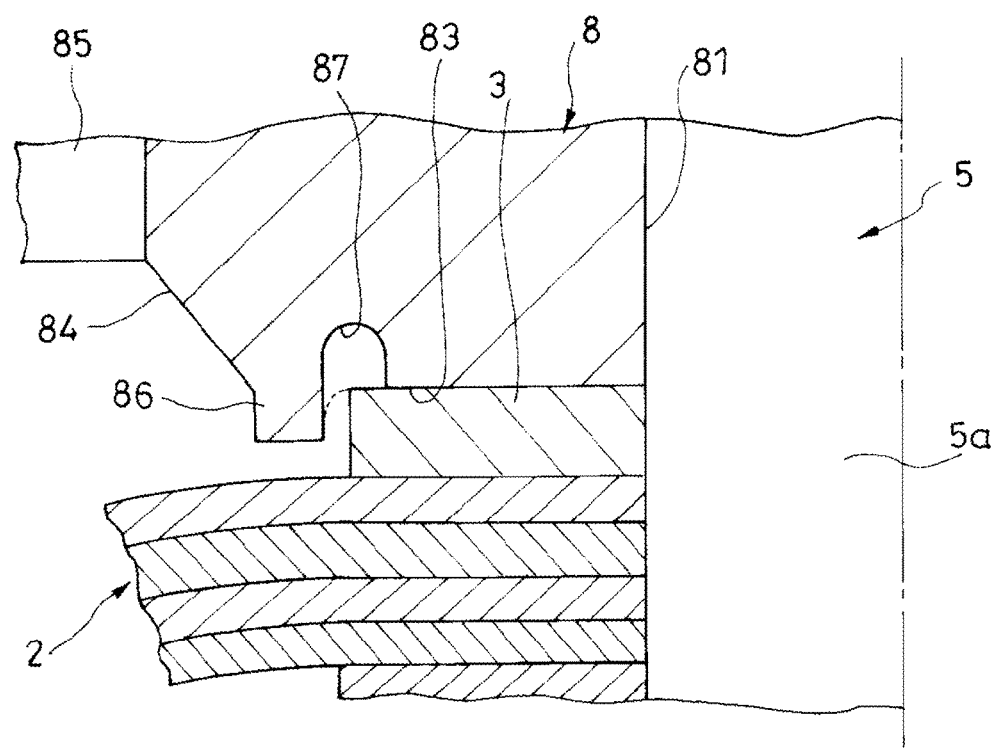
FIG. 9 is a partially expanded vertical cross-section view of a piston of a shock absorber in which a damping valve according to an alternative embodiment of the fourth embodiment is implemented.

If the valve disc 8 including the projection 86 is produced by sinter molding, there are cases in which an arced surface is formed on a rising portion on the surface of the projection 86 on the spacer 3 side as shown by the dashed line in FIG. 9.

In this way, if an arced surface is formed on the rising portion of the projection 86, the spacer 3 may ride over the projection 86 if the spacer 3 rides up on the arced surface. Thus, it is preferable to remove the arced surface by cutting it.

Alternatively, as shown in FIG. 9, a groove 87 may be formed in advance in the valve disc 8 more toward the spacer 3 side (inside) from the projection 86 so that an arced surface is not formed during production of the valve disc 8. In this way, in the damping valve in which the groove 87 is formed in the valve disc 8, the groove 87 can be provided during molding of the valve disc 8, and thus the processing of the valve disc 8 is easier compared to a case in which the arced surface must be removed by cutting after producing the valve disc 8 by sinter molding.

Figure 10:
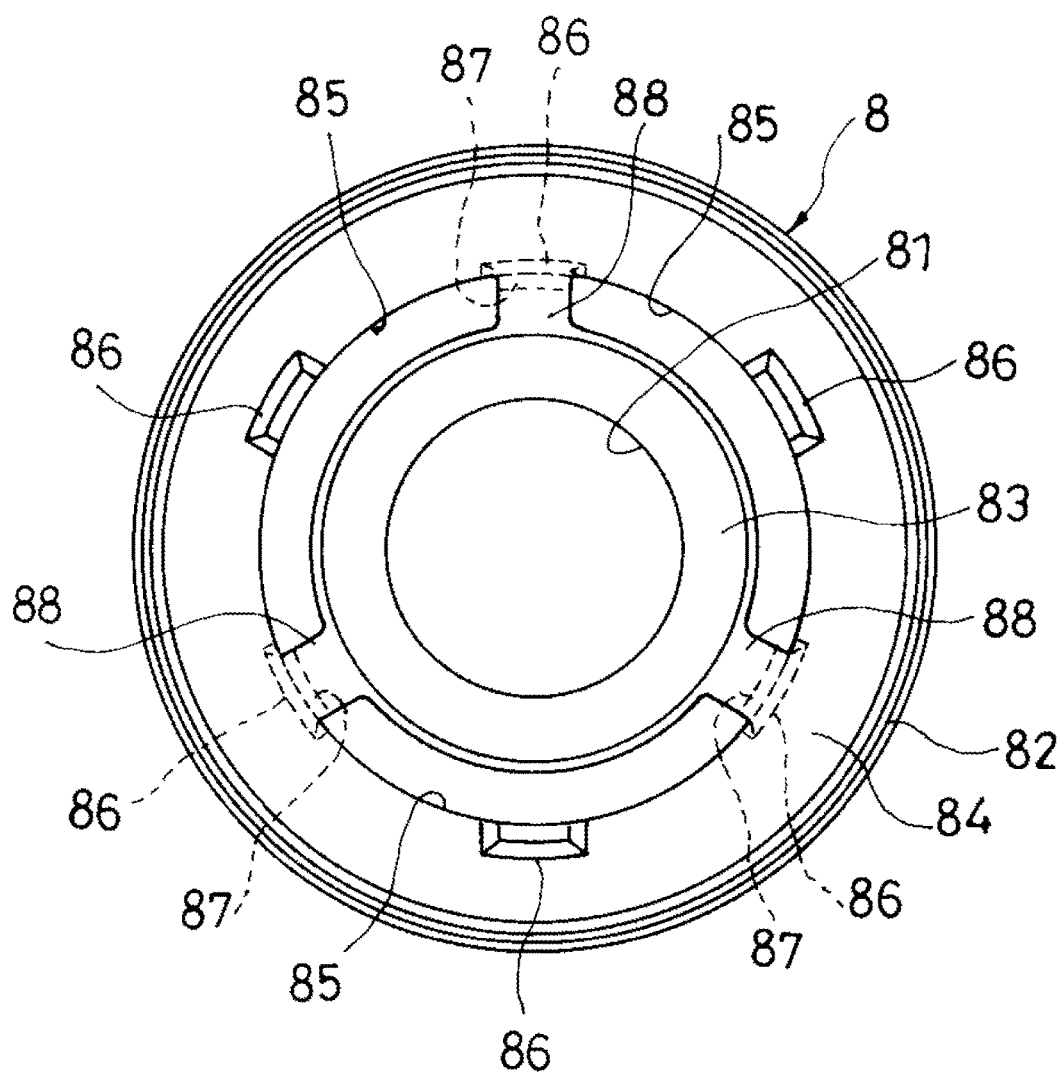
FIG. 10 is a plan view of a valve disc in a damping valve according to another alternative embodiment of the fourth embodiment.

Instead of providing the groove 87, projections 86 may be provided on the outer periphery of the ports 85 in order to make the ports 85 function as a groove as shown in FIG. 10.

In the valve disc 8 shown in FIG. 10, three arcuate ports 85 are provided, and one projection 86 is provided on the outer periphery of each port 85. The inner walls on the spacer 3 side of the projections 86 are flush with the wall surfaces on the outer periphery side of the ports 85. Thus, the ports 85 and the projections 86 can be molded simultaneously when sinter molding the valve disc 8 without any arced surfaces being formed on the side surfaces of the projections 86.

In this constitution, a gap equal to the width of the ports 85 is formed between the spacer 3 laminated on the inner peripheral seat 83 and the projections 86. However, even if the spacer 3 moves relative to the valve disc 8, the spacer 3 will not exhibit significant positional deviation relative to the valve disc 8 due to the projections 86, and the spacer 3 will not move enough to make it difficult to insert the distal end 5*a* of the piston rod 5. Therefore, the projections 86 function sufficiently as the positioning part.

As shown by the dashed lines in FIG. 10, positional deviation of the spacer 3 can also be prevented by providing further projections 86 on the outer periphery of cross-linking portions 88 between the ports 85 and providing grooves 87 on the inner peripheral side of the projections 86 so as to form a total of six projections 86. As long as the projections 86 are disposed on the outer periphery of the spacer 3 in order to avoid significant positional deviation of the spacer 3 in the radial direction relative to the valve disc 8, the projections 86 can be disposed at any positions on the valve disc 8. For example, although not illustrated, the projections 86 may be provided on the cross-linking portions 88 between the ports 85.

The above embodiments were explained in relation to an example of applying the present invention to an extension-side damping valve of a shock absorber. However, the present invention can be applied not only to an extension-side damping valve but also a pressure-side damping valve, or to both the extension-side and the pressure-side damping valves. Further, the valve disc includes extension-side and pressure-side ports 15 and 16 so as to make the valve disc function as the piston 1. However, the valve disc can be used in other applications besides a piston. In this case, the damping valve of the above embodiments can also naturally be applied to a valve disc that has only extension-side ports or only pressure-side ports.

Further, in the examples explained above, the damping valve of the above embodiments was assembled on the distal end 5a of the piston rod 5. However, the present invention can also be applied to a damping valve that is assembled on a bolt of a base valve without any loss of the above-described effects of the present invention.

The present invention is not limited to the one embodiment mentioned above, and various modifications and applications thereof are possible.

The present application claims propriety based on Japanese Patent Application No. 2013-61284 filed with Japan patent office on Mar. 25, 2013 all of which are incorporated herein by reference.

The invention claimed is:

1. A damping valve, comprising:
an annular valve disc, the valve disc comprising:
an annular outer peripheral seat that projects in an axial direction of the valve disc;
an inner peripheral seat that is provided on an inside of the outer peripheral seat and projects in the axial direction;
an annular window formed between the outer peripheral seat and the inner peripheral seat; and
a port that communicates with the annular window;
a valve having an annular leaf that is seated/unseated on the outer peripheral seat; and
an annular spacer interposed between the annular leaf and the inner peripheral seat, the annular spacer being configured to set an initial deflection amount of the annular leaf,
wherein:
the valve disc further comprises a positioning part formed on the inner peripheral seat and being configured to restrict positional deviation of the spacer in a radial direction relative to the valve disc, the positioning part including a projection that projects from the inner peripheral seat in the axial direction and opposes an outer periphery of the spacer in the radial direction.

2. The damping valve according to claim 1, wherein a groove is provided in the valve disc on a spacer side of the projection.

3. The damping valve according to claim 1, wherein
the valve disc is laminated on a piston, and
the outer peripheral seat and the inner peripheral seat are located on an outside of the piston in the axial direction.

4. The damping valve according to claim 1, wherein an end of the valve disc expands in diameter and the outer peripheral seat is formed at the end of the valve disc.

5. The damping valve according to claim 1, wherein the positioning part restricts the positional deviation of the spacer in the radial direction by applying a reactive force to the spacer against a force causing the positional deviation.

6. The damping valve according to claim 1, wherein the positioning part restricts the positional deviation of the spacer in the radial direction during an assembly process of the damping valve.

* * * * *